(12) United States Patent
Robinson

(10) Patent No.: US 7,232,135 B2
(45) Date of Patent: Jun. 19, 2007

(54) WHEELBARROW

(76) Inventor: Douglas Robinson, 8705 Fireside, Dallas, TX (US) 75217

( * ) Notice: Subject to any disclaimer, the term of this patent is extended or adjusted under 35 U.S.C. 154(b) by 221 days.

(21) Appl. No.: 10/989,808

(22) Filed: Nov. 16, 2004

(65) Prior Publication Data
US 2006/0103088 A1 May 18, 2006

(51) Int. Cl.
B62B 1/00 (2006.01)
B62D 61/00 (2006.01)
B62C 61/00 (2006.01)

(52) U.S. Cl. ............... 280/47.31; 280/47.3; 280/47.24; 280/47.32; 280/78; 280/63

(58) Field of Classification Search ............ 280/47.31, 280/47.3, 47.24, 47.32, 78, 63
See application file for complete search history.

(56) References Cited

U.S. PATENT DOCUMENTS

| 686,262 | A | * | 11/1901 | Cone et al. | ............... 280/47.31 |
| 1,965,409 | A | * | 7/1934 | Forrer | ............... 280/47.31 |
| 1,969,457 | A | * | 8/1934 | Forrer | ............... 280/47.31 |
| 3,282,600 | A | * | 11/1966 | Tonelli | ............... 280/47.31 |
| 4,270,786 | A | * | 6/1981 | Mattox | ............... 298/3 |
| 5,749,588 | A | * | 5/1998 | Stallbaumer | ............ 280/47.27 |
| 6,851,739 | B2 | * | 2/2005 | Morley | ............... 296/102 |
| 2003/0011154 | A1 | * | 1/2003 | Scott et al. | ............... 280/47.31 |
| 2003/0201616 | A1 | * | 10/2003 | Friel | ............... 280/47.31 |

FOREIGN PATENT DOCUMENTS

GB 2220391 A * 1/1990

* cited by examiner

Primary Examiner—Christopher P. Ellis
Assistant Examiner—John R. Olszewski
(74) Attorney, Agent, or Firm—Scheef & Stone, L.L.P.; Jack D. Stone, Jr.

(57) ABSTRACT

A wheelbarrow has a main frame defining two laterally spaced-apart longitudinal portions, to which an axle is mounted with a wheel rotatably mounted thereto, and to which a body, such as a tub or flat bed, is mounted for carrying a load. Attached to the main frame are leg structures, each of which includes a straight base portion configured for aligning with and engaging the ground. Forward cross-braces are connected from a forward end of each base portion to a first point on the main frame, and rearward cross-braces are connected from a rearward end of each base portion to a second point on the main frame proximately adjacent to the first point. A lateral member extends from one longitudinal portion of the main frame to the other longitudinal portion, and a lateral cross brace extends from each leg structure to the lateral member.

8 Claims, 4 Drawing Sheets

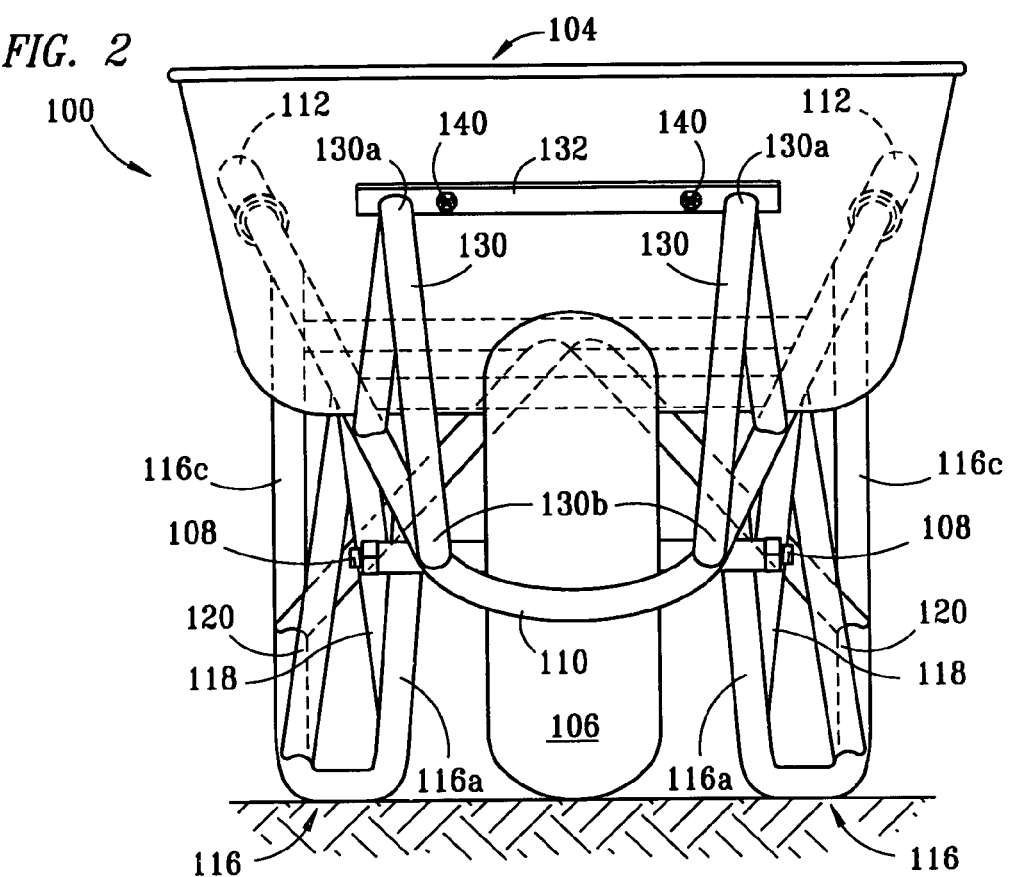
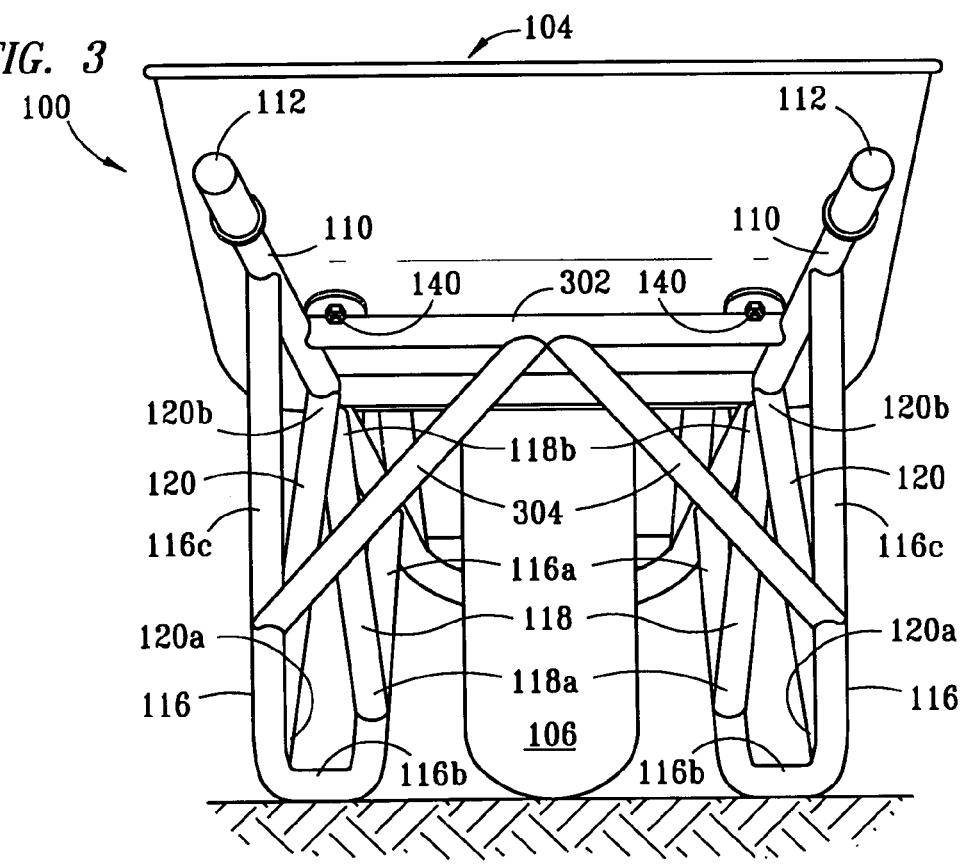

WHEELBARROW

TECHNICAL FIELD

The invention relates generally to wheelbarrows and, more particularly, to a structural frame effective for use with a wheelbarrow.

BACKGROUND

The use of wheelbarrows of various designs and configurations is known in the prior art. More specifically, wheelbarrows of various designs and configurations heretofore devised and utilized for the purpose of improving the stability of wheelbarrows by using improved frames are known to consist basically of familiar, expected, and obvious structural configurations, notwithstanding the myriad of designs encompassed by the crowded prior art which has been developed for the fulfillment of countless objectives and requirements.

There are nonetheless, a number of drawbacks still associated with conventional wheelbarrows. For example, if conventional wheelbarrows are used to carry very substantial loads, they tend to be instable (resulting in a tendency for the wheelbarrow to tip over during use), unreliable, and have relatively short life expectancies. Accordingly, continuing research has been directed to the development of wheelbarrows having relatively substantial load bearing capabilities which are also more rigid and reliable than conventional wheelbarrows, and also have longer life expectancies than convention wheelbarrows.

SUMMARY

The present invention, accordingly, provides a wheelbarrow having a main frame defining first and second spaced-apart longitudinal portions. An axle is mounted on the main frame, and a wheel is rotatably mounted on the axle. A body, such as a tub or flat bed, is mounted to the main frame for supporting and carrying a load. A first leg structure is attached to the first longitudinal portion of the main frame, and includes a substantially straight base portion configured for aligning with and engaging ground when the wheelbarrow is placed in a stationary position. Similarly, a second leg structure is attached to the second longitudinal portion of the main frame, and includes a substantially straight base portion configured for aligning with and engaging ground when the wheelbarrow is in placed a stationary position.

In one embodiment, cross-bracing is provided extending from each end of each base portion of each leg structure to the main frame.

In another embodiment of the invention, the main frame, first leg structure, and second leg structure are fabricated from tubular steel, and are welded together.

In another embodiment, a lateral member is positioned to extend between the first and second longitudinal portions of the main frame, and lateral cross braces are positioned to extend from the lateral member to the first and second leg structures.

In another embodiment, the main frame extends to define laterally spaced-apart rearwardly extending handles.

In another embodiment, body support members extend from the longitudinal portions of a forward portion of the main frame to form a first substantially triangular structure effective for supporting the body. A transverse member is preferably also connected between the triangular structures for reinforcing support of the body.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 is a front elevation view of the wheelbarrow of FIG. 1;

FIG. 3 is a rear elevation view of the wheelbarrow of FIG. 1;

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning welded connections and the like have been omitted inasmuch as such details are not considered necessary to obtain a complete understanding of the present invention, and are considered to be within the skills of persons of ordinary skill in the relevant art.

It is noted that structural members depicted herein are preferably tubular members, though they may alternatively comprise other cross-section configurations such as square, rectangular, triangular, I-beam, U-beam, and the like. Structural members are preferably welded together, though any suitable means or combination of means, such as bolting, may be employed to join members together. The structural members may be fabricated from any of a number of different materials, such as steel, aluminum, or the like.

For definitional purposes, the following terms will be used for referring to the fully assembled wheelbarrow in normal use. The term "horizontal" refers to the direction parallel to a surface (e.g., ground) on which the wheelbarrow is supported in normal use. The term "vertical" refers to a direction substantially perpendicular to the horizontal direction. The term "front" or "forward" refers to the end of the wheelbarrow proximate to the wheel (described below) of the wheelbarrow. The term "rear" or "rearward" refers to the end opposite the front end of the wheelbarrow. The term "point" refers to an area approximating the size of a cross-section of a member proximate to the point.

Figure 1:
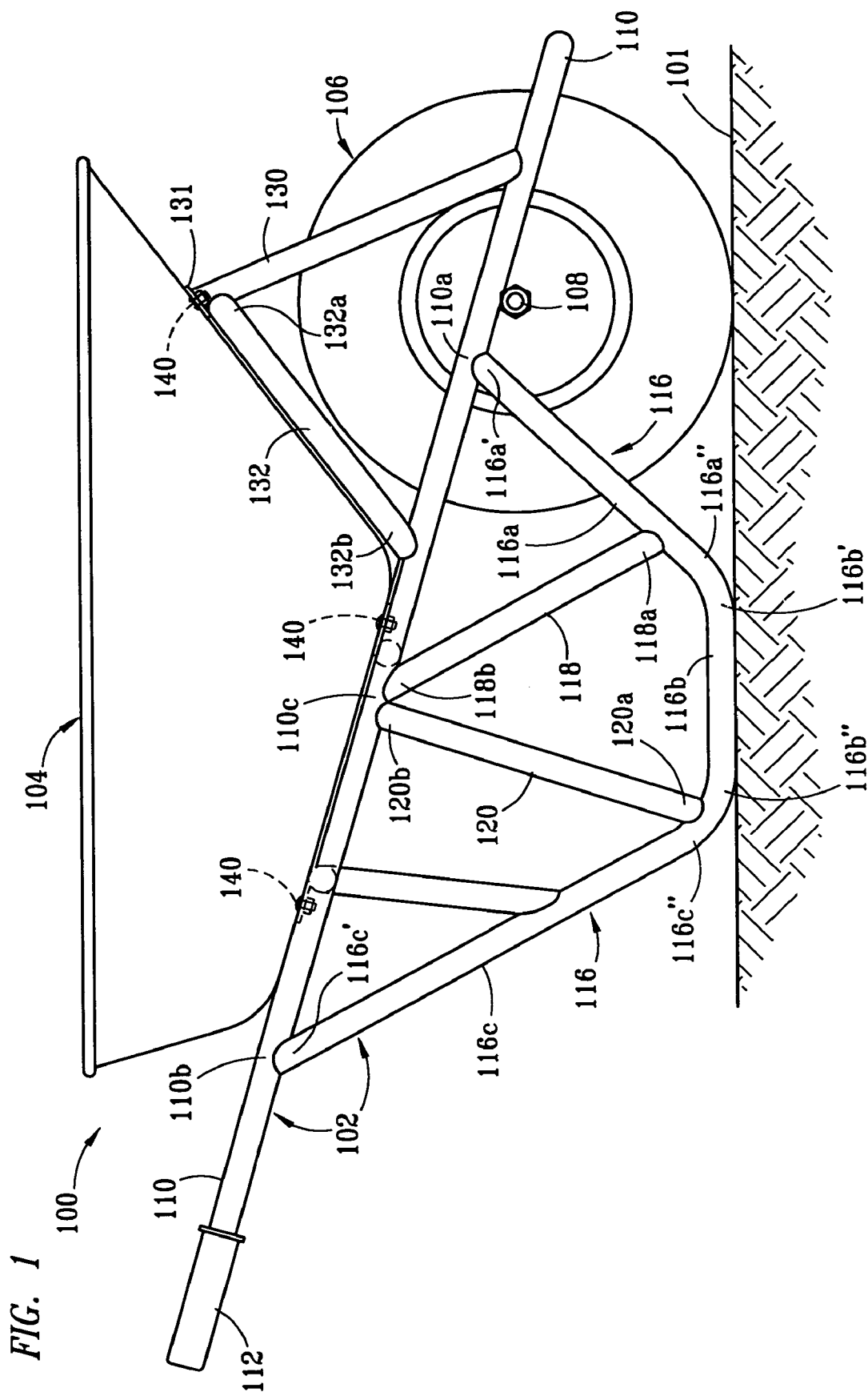
FIG. 1 is a side elevation view of a wheelbarrow embodying features of the present invention.

Referring to FIG. 1 of the drawings, the reference numeral 100 generally designates a wheelbarrow embodying features of the present invention. The wheelbarrow 100 includes a main frame 102 configured for supporting a body 104 (e.g., a tub or flat bed). The main frame 102 further includes an axle 108 on which a wheel and tire 106 are axially mounted for facilitating movement of the wheelbarrow by a person in a conventional manner.

The frame 102 includes a longitudinal portion 110 which extends generally through the length of the wheelbarrow 100. As shown more clearly in FIG. 4, the longitudinal portion 110 preferably wraps less than 180° around the wheel and tire 106, and two ends of the longitudinal portion 110 extend rearwardly from an opposing end of the wheel and tire 106 of the wheelbarrow 100 to form handles, to each of which handles handgrips are preferably positioned, the handgrips preferably comprising a material, such as rubber, nylon, or the like, that is effective for enabling a person to lift the rear end of wheelbarrow 100 in a conventional manner.

Figure 4:
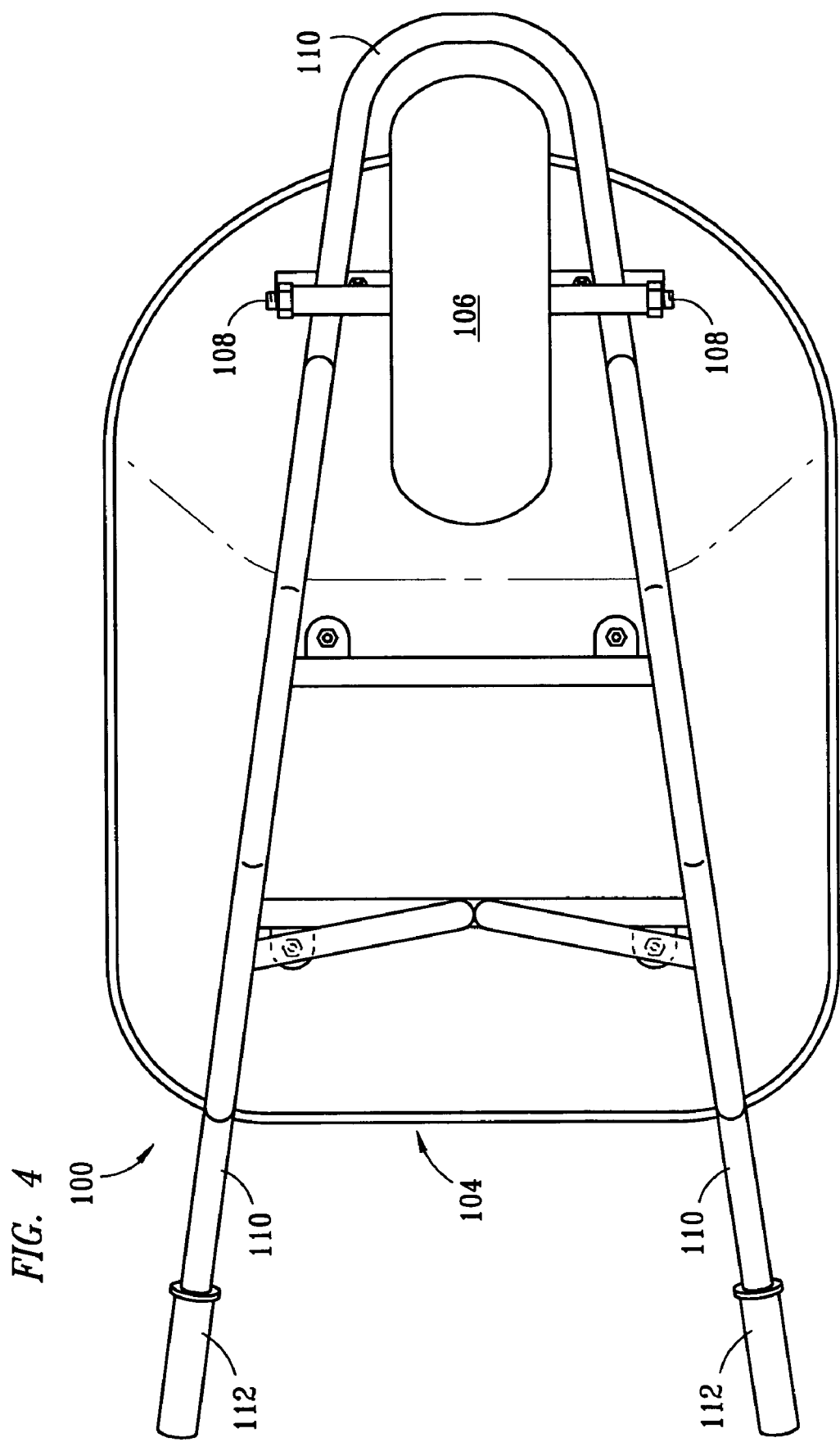
FIG. 4 is a bottom view of the wheelbarrow of FIG. 1.

As also shown in FIG. 4, the wheel and tire 106 are rotatably mounted to the axle 108, which axle is secured to the wheelbarrow 100, by means such as welding. The axle 108 is preferably fabricated from relatively heavy duty material effective for supporting heavy loads (e.g., stone and brick) in the body 104.

Referring back to FIG. 1, the frame 110 further includes two leg structures 116 (only one of which is shown in FIG. 1). Each leg structure 116 includes a forward portion 116a defining a first end 116a' extending from a point 110a of the longitudinal portion 110 to a second end 116a", a horizontal (as viewed in FIG. 1) base portion 116b having a first end 116b' extending from the second end 116a" of the forward portion 116a to second end 116b", and a rearward portion 116c having a second end 116c" extending from the second end 116b" of the base portion 116b to a first end 116c' secured to a rearward point 10b of the longitudinal portion 110 of the main frame 102.

Two forward cross braces 118 and two rearward cross braces 120 are secured, preferably via welding, between the longitudinal portion 110 and each leg structure 116 to form a substantially triangular truss structure. More specifically, each forward cross brace 118 is preferably secured (e.g., welded) at a first end 118a proximate to the second end 116a" of the forward portion 116a and the first end 116b' of the base portion 116b of each leg structure 116, and is preferably secured (e.g., welded) at a second end 118b proximate to a point 110c interposed between the points 110a and 110b of the respective longitudinal portion 110. Each rearward cross brace 120 is preferably secured (e.g., welded) at a first end 120a proximate to the second end 116b" of the base portion 116b and second end 116c" of rearward portion 116c of each leg 116, and is preferably welded at a second end 120b proximate to the point 110c interposed between the points 110a and 110b of the respective longitudinal portion 110.

In a preferred embodiment, two forward body support members 130 are welded at first ends 130a to a forward portion of the longitudinal portion 110, and two rearward body support members 132 are welded at first ends 132a to the longitudinal portion 110, and second ends 130a and 132b of respective of body support members 130 and 132 are welded together to form a substantially triangular structure effective for supporting the body 104. A cross brace 134 (see also FIG. 3) preferably extends proximately between the two second ends 130b, though alternatively could extend proximately between the two second ends 132b, for providing support to the tub 104.

The body 104 is secured to the frame 110 in a conventional manner using fasteners, such as bolts and nuts, rivets, and/or the like 140.

FIG. 3 depicts a rearward support bracing structure preferably incorporated into the main frame 102. More specifically, a lateral member 302 extends between the longitudinal portions 110 of the main frame 102. A first lateral cross brace 304 extends from the rearward portion 116c of one leg structure 116 to the lateral member 302, and a second lateral cross brace 306 extends from the rearward portion 116c of an opposing leg structure 116 to the lateral member 302.

In operation, the wheelbarrow 100 is operable in a "stationary" mode, wherein it positioned substantially as shown in FIG. 1, with the base portions 116b of each leg structure 116 substantially aligned and engaged with a support surface 101, such as the ground, floor, or the like. In the stationary mode, the wheelbarrow 100 may be loaded with stone, brick, dirt, or the like, or the same may be unloaded from the wheelbarrow. The wheelbarrow 100 is also operable in a "mobile" mode, wherein a person (not shown) may grip the handles 112 and lift the rear portion of the wheelbarrow 100, and then move the wheelbarrow as desired to a new location. When the new location is reached, then rear portion of the wheelbarrow 100 may be lowered and restored to a stationary mode. Because the operation of a wheelbarrow is considered to be well-known, its operation will not be described in further detail herein.

Figure 5:
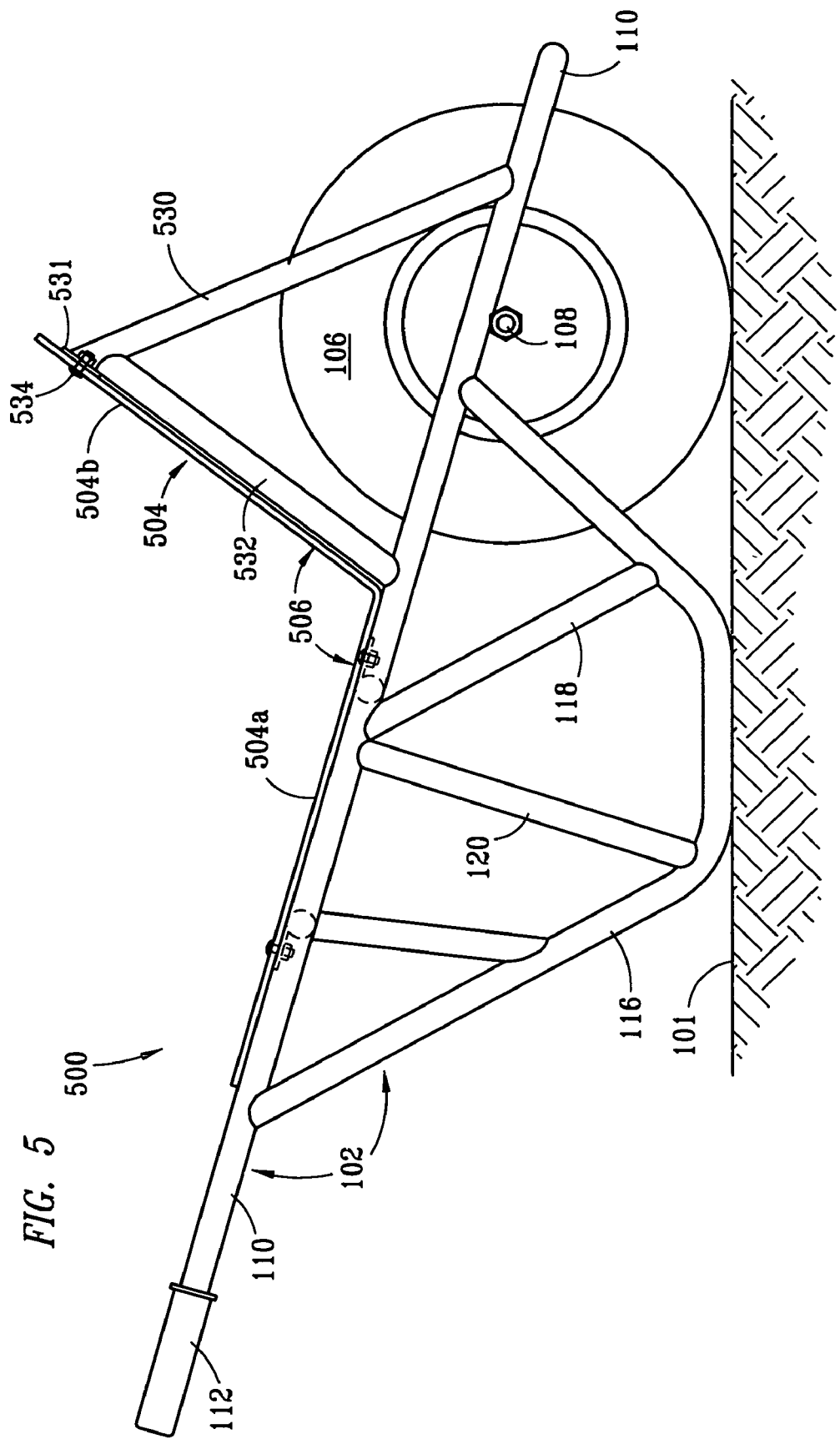
FIG. 5 is a side elevation view of an alternative embodiment of a wheelbarrow embodying features of the present invention.

In FIG. 5, the reference numeral 500 designates an alternative embodiment of the invention adapted for a body comprising a flat bed. To that end, the main frame 102 is configured substantially as depicted above with respect to FIGS. 104, but for the forward body support structure members 130 and 132, which are preferably reconfigured as two forward body support members 530 (only one of which is shown in FIG. 5), and two rearward body support members 532 (only one of which is shown in FIG. 5), which rearward body support members 532 are positioned at an angle 506 (discussed below) more suitable for supporting a flat bed 504 rather than a tub. The flat bed 504 includes a lower portion 504a and an upwardly extending portion 504b. An angle 506 between the lower portion 504a and the upwardly extending portion 504b is preferably greater then 90°, such as about 100°, 110°, or the like. Operation of the wheelbarrow 500 is substantially similar to the wheelbarrow 100, but for the step of loading, wherein the flat bed 504 is adapted for more efficiently loading and carrying rectangular-shaped objects and objects having flat surfaces, such as bricks, wood, and the like. It is noted that the main frame depicted in FIGS. 1–4 may alternatively be used with a flat bed if the space between the member 132 and the flat bed portion 504b is provided with a wedge-shaped spacer (not shown).

By the use of the present invention heavy loads, such as a load of stones, bricks, dirt, and the like, may be moved using a wheelbarrow that is more rigid, more reliable, and able to greater loads with a greater life expectancy than is possible using wheelbarrows disclosed in the prior art.

It is understood that the present invention may take many forms and embodiments. Accordingly, several variations may be made in the foregoing without departing from the spirit or the scope of the invention. For example, the wheel and tire 106 may be supplemented with a second wheel and tire. Each of the portions 116a, 116b, and/or 116c of the leg 116 may constitute separate members that are welded together. An engine may be positioned within the frame 102 under the body 104 for propelling the wheelbarrow, under the guidance of a person. Rear wheels may be provided for the wheelbarrow to enable a person to move the wheelbarrow without lifting the rear end of the wheelbarrow. It is understood, too, that the connection of the forward cross braces 118 to the leg structures 116 may be in closer proximity to the first end 116b' of the base portion 116b of each leg structure 116 than is depicted in FIGS. 1 and 5.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A wheelbarrow comprising:
   a main frame defining first and second spaced-apart longitudinal portions;
   an axle mounted on said main frame;
   a wheel rotatably mounted on said axle;
   a body mounted to said main frame and configured for supporting a load;
   a first leg structure having:
      a forward portion having a first end and a second end, said first end of said first forward portion of said first leg structure being secured to a forward point of said first longitudinal portion of said main frame,
      a rearward portion having a first end and a second end, said first end of said rearward portion of said first leg structure being secured to a rearward point of said first longitudinal portion of said main frame, and
      a base portion extending from said second end of said forward portion of said first leg structure to said second end of said rearward portion of said first leg structure, said base portion of said first leg structure being substantially straight for substantially aligning with and engaging ground along the substantially entire length of the base portion when said wheelbarrow is in a stationary position; and
   a second leg structure having:
      a forward portion having a first end and a second end, said first end of said second forward portion of said second leg structure being secured to a forward point of said second longitudinal portion of said main frame,
      a rearward portion having a first end and a second end, said first end of said second rearward portion of said second leg structure being secured to a rearward point of said second longitudinal portion of said main frame, and
      a base portion extending from said second end of said forward portion of said second leg structure to said second end of said rearward portion of said second leg structure, said base portion of said second leg structure being substantially straight for substantially aligning with and engaging ground along the substantially entire length of the base portion when said wheelbarrow is in a stationary position;
   a lateral member which extends from said first longitudinal portion of said main frame to said second longitudinal portion of said main frame;
   a first lateral cross brace extending from said rearward portion of said first leg structure to said lateral member; and
   a second lateral cross brace extending from said rearward portion of said second leg structure to said lateral member.

2. The wheelbarrow of claim 1 wherein said body comprises a tub.

3. The wheelbarrow of claim 1 wherein said body consists essentially of a substantially flat bed defining four sides, one side of which includes a wall extending therefrom.

4. The wheelbarrow of claim 1 wherein said main frame, said first leg structure, and second leg structure are fabricated from tubular steel.

5. The wheelbarrow of claim 1 wherein:
   said first end of said forward portion of said first leg structure is welded to said forward point of said first longitudinal portion of said main frame,
   said first end of said rearward portion of said first leg structure is welded to said rearward point of said first longitudinal portion of said main frame,
   said first end of said forward portion of said second leg structure is welded to said forward point of said second longitudinal portion of said main frame, and
   said first end of said rearward portion of said second leg structure is welded to said rearward point of said second longitudinal portion of said main frame.

6. The wheelbarrow of claim 1 further comprising:
   a first forward cross brace extending from a point proximate to said second end of said forward portion of said first leg structure proximately to a point interposed between said forward point and said rearward point of said first longitudinal portion of said main frame,
   a first rearward cross brace extending from a point proximate to said second end of said rearward portion of said first leg structure proximately to said point interposed between said forward point and said rearward point of said first longitudinal portion of said main frame,
   a second forward cross brace extending from a point proximate to said second end of said forward portion of said second leg structure proximately to a point interposed between said forward point and said rearward point of said second longitudinal portion of said main frame, and
   a second rearward cross brace extending from a point proximate to said second end of said rearward portion of said second leg structure proximately to said point interposed between said forward point and said rearward point of said second longitudinal portion of said main frame.

7. The wheelbarrow of claim 1, wherein said main frame further comprises laterally spaced-apart rearwardly extending handles.

8. The wheelbarrow of claim 1, further comprising:
   two first body support members extending from said first longitudinal portion of said main frame and configured to form a first substantially triangular structure effective for supporting said body;
   two second body support members extending from said second longitudinal portion of said main frame and configured to form a second substantially triangular structure effective for supporting said body; and
   a transverse member connected from said first triangular structure to said second triangular structure for reinforcing support of said body.

* * * * *